No. 822,403. PATENTED JUNE 5, 1906.
U. G. SWEENEY & M. L. MAYES.
BICYCLE SEAT SPRING.
APPLICATION FILED JULY 31, 1905.
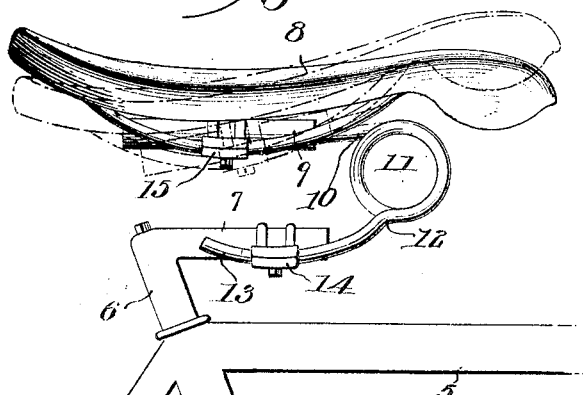
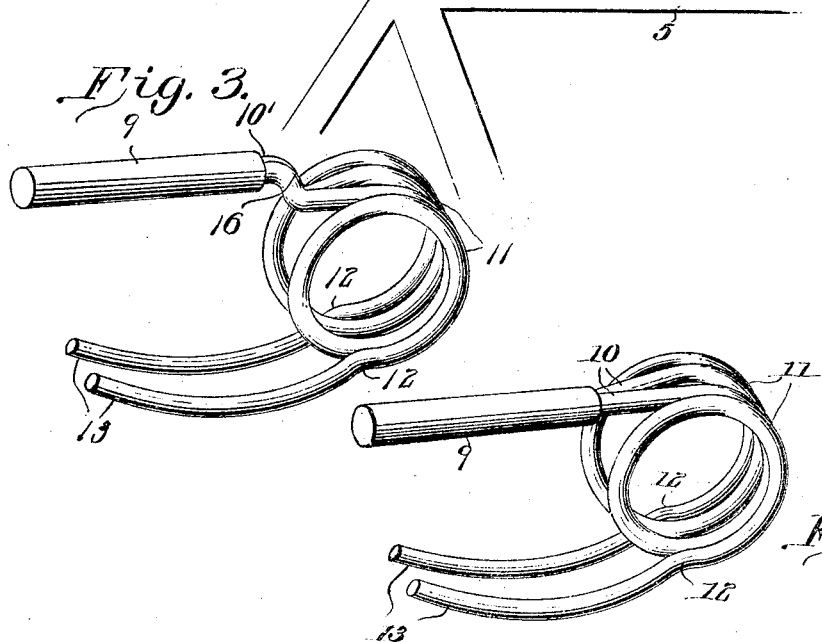

UNITED STATES PATENT OFFICE.

ULYSSES G. SWEENEY AND MELVIN L. MAYES, OF OROSI, CALIFORNIA.

BICYCLE-SEAT SPRING.

No. 822,403.      Specification of Letters Patent.      Patented June 5, 1906.

Application filed July 31, 1905. Serial No. 272,001.

*To all whom it may concern:*

Be it known that we, ULYSSES G. SWEENEY and MELVIN L. MAYES, citizens of the United States, residing at Orosi, in the county of Tulare and State of California, have invented a new and useful Bicycle-Seat Spring, of which the following is a specification.

This invention relates to saddle-supporting springs for bicycles and similar vehicles, and has for its object to provide an inexpensive, durable, and efficient device of this character for yieldably supporting the seat on the saddle-post so as to effectually absorb any jarring motion incident to riding over rough roads.

A further object of the invention is to provide means for tilting the seat or saddle at any angle or inclination with respect to the bicycle-frame, and, further, to provide means whereby the saddle may be adjusted longitudinally of the supporting-spring, so as to increase or decrease the tension of the latter.

With these and other objects in view the invention consists in the construction and novel combination and arrangement of parts hereinafter fully described, illustrated in the accompanying drawings, and pointed out in the claims hereto appended, it being understood that various changes in form, proportions, and minor details of construction may be resorted to without departing from the principle or sacrificing any of the advantages of the invention.

In the accompanying drawings, forming a part of this specification, Figure 1 is a side elevation of a portion of a bicycle-frame, showing a saddle provided with the improved supporting-spring. Fig. 2 is a perspective view of the supporting-spring detached. Fig. 3 is a perspective view of a modified form of the invention.

Similar numerals of reference indicate corresponding parts in all the figures of the drawings.

In the accompanying drawings, 5 designates a portion of a bicycle-frame, 6 the saddle-post or standard provided with the usual angular extension 7, and 8 the seat or saddle, these parts being of the ordinary construction and forming no part of the present invention.

The improved supporting-spring, which may be constructed of spring-wire or other suitable material, is preferably formed in two sections, secured together by a clamping sleeve or collar 9, upon which is mounted for longitudinal movement the seat or saddle 8. Each section comprising the spring is provided with a horizontal arm 10, one end of which is soldered or otherwise rigidly secured within the sleeve or collar 9, while the opposite end thereof is bent to form an intermediate coil 11, the wire after the coil is formed being offset, as indicated at 12, and terminating in a curved arm or extension 13 for attachment to the angular extension of the standard 6. The curved arms 13 are secured to the angular extension 7 by means of an attaching-clamp 14, while the seat or saddle 8 is secured to the sleeve or collar 9 by a similar clamp 15.

The spring is preferably positioned on the angular extension with the coils thereof disposed immediately beneath the pommel of the saddle, whereby the rear end of the saddle will be depressed under the weight of the rider, so as to prevent the latter from sliding off the front end of the saddle when riding or coasting down hills or steep grades.

By releasing the clamping member 14 and sliding the curved arms 13 longitudinally of the extension 7 the seat or saddle may be tilted at any angle or inclination with respect to the frame 5, said saddle being securely locked in adjusted position by tightening the clamping member, as will be readily understood. It will also be observed that by adjusting the saddle longitudinally of the sleeve or collar 9 the tension of the spring may be proportionately increased or decreased, so as to accommodate riders of different weight.

If desired, the spring may be placed in position on the angular extension with the coils thereof beneath the rear of the saddle and the sleeve or collar may be dispensed with, the seat or saddle being clamped directly to the horizontal arms.

In Fig. 3 of the drawings there is illustrated a modified form of the invention in which the horizontal arms 10' are offset, as indicated at 16, so as to elevate the clamping sleeve or collar a short distance above the spring-coil, as shown.

From the foregoing description it will be seen that there is provided an extremely simple and inexpensive device admirably adapted for the attainments of the ends in view.

Having thus described the invention, what is claimed is—

A saddle-supporting spring comprising a pair of horizontally-disposed arms the ends of which are bent to form coincident coils, said coils being provided with offsets defining upwardly-curved arms for attachment to a bicycle saddle-post, and a tubular clamping-sleeve engaging said horizontal arms and adapted to support the saddle.

In testimony that we claim the foregoing as our own we have hereto affixed our signatures in the presence of two witnesses.

ULYSSES G. SWEENEY.
MELVIN L. MAYES.

Witnesses:
B. F. KNOTT,
G. CAHN.